United States Patent
Park et al.

(10) Patent No.: US 8,265,165 B2
(45) Date of Patent: Sep. 11, 2012

(54) METHOD AND APPARATUS FOR VIDEO DECODING TO IMPROVE PICTURE QUALITY BASED ON PICTURE QUALITY ESTIMATION, IN THE PRESENCE OF NOISE

(75) Inventors: Young-O Park, Seongnam-si (KR);
Young-Hun Joo, Yongin-si (KR);
Kwang-Pyo Choi, Anyang-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 915 days.

(21) Appl. No.: 12/340,826

(22) Filed: Dec. 22, 2008

(65) Prior Publication Data

US 2009/0161768 A1    Jun. 25, 2009

(30) Foreign Application Priority Data

Dec. 20, 2007 (KR) .................. 10-2007-0134331

(51) Int. Cl.
*H04N 7/26* (2006.01)
(52) U.S. Cl. .............. 375/240.24; 375/240.27

(58) Field of Classification Search ............. 375/240.01, 375/240.24, 240.27; *H04N 7/26*
See application file for complete search history.

(56) References Cited

U.S. PATENT DOCUMENTS

2005/0281333 A1* 12/2005 Ghanbari ................ 375/240.16
* cited by examiner

*Primary Examiner* — Y Lee
*Assistant Examiner* — Yulin Sun
(74) *Attorney, Agent, or Firm* — Cha & Reiter, LLC

(57) ABSTRACT

A method and apparatus for decoding video data that is encoded by bit rate control to keep a bandwidth of a bit stream in a predetermined range are provided. The encoded video data is decoded, picture quality estimation information is estimated, the estimation including information about a bit stream size of a decoded video frame, the number of fragmented macro blocks included in the video frame, and the number of skip-mode macro blocks included in the video frame, the picture quality of the video data is determined based on a correlation between picture quality estimation information and SNR, and the video data is output by applying a picture quality improving algorithm to the video data, if the determined picture quality is lower than a predetermined level.

12 Claims, 7 Drawing Sheets

| Experiment | Video | Image size | Frame rate (fps) | Total frame number (frames) | Data rate (kbps) | I-frame interval (frames) |
|---|---|---|---|---|---|---|
| Experiment 1 | Container | QVGA (320x240p) | 30 | 300 | 384 | 30 |
| Experiment 2 | Crew | QVGA (320x240p) | 30 | 300 | 384 | 30 |
| Experiment 3 | Foreman | QVGA (320x240p) | 30 | 300 | 384 | 30 |
| Experiment 4 | Harbor | CIF (352x288p) | 30 | 300 | 384 | 30 |
| Experiment 5 | Mobile | CIF (352x288p) | 30 | 300 | 384 | 30 |
| Experiment 6 | Soccer | CIF (352x288p) | 30 | 300 | 384 | 30 |
| Experiment 7 | Stefan | CIF (352x288p) | 30 | 300 | 384 | 30 |

FIG.5

| Experiment | Video | PSNR | | SIZE | SKIP | INTRA | MV_PWR | 4MV |
|---|---|---|---|---|---|---|---|---|
| | | AVG | STDDEV | | | | | |
| Experiment 1 | Container | 43.575 | 0.707 | 1481.9 | 87.16 | 0.031 | 3.381 | 17.83 |
| Experiment 2 | Crew | 36.550 | 0.489 | 1732.63 | 8.031 | 24.97 | 81.55 | 80.83 |
| Experiment 3 | Foreman | 34.379 | 2.099 | 1634.8 | 13.31 | 0.789 | 119.69 | 72.54 |
| Experiment 4 | Harbor | 27.794 | 1.948 | 1725.63 | 42.51 | 0.007 | 5.405 | 79.37 |
| Experiment 5 | Mobile | 32.068 | 0.726 | 1715.9 | 11.16 | 0.076 | 4.114 | 54.04 |
| Experiment 6 | Soccer | 28.279 | 1.118 | 1704.7 | 9.26 | 1.678 | 389 | 79.57 |
| Experiment 7 | Stefan | 24.375 | 1.536 | 1813.2 | 17.18 | 1.284 | 302.95 | 80.99 |

FIG.6

| Experiment | Video | PSNR | | Correlation | | | | |
|---|---|---|---|---|---|---|---|---|
| | | AVG | STDDEV | SIZE | SKIP | INTRA | MV_PWR | 4MV |
| Experiment 1 | Container | 43.575 | 0.707 | −0.480 | 0.151 | N/A | −0.214 | −0.034 |
| Experiment 2 | Crew | 36.550 | 0.489 | −0.625 | 0.481 | −0.108 | −0.224 | 0.443 |
| Experiment 3 | Foreman | 34.379 | 2.099 | −0.254 | 0.131 | 0.097 | 0.312 | 0.709 |
| Experiment 4 | Harbor | 27.794 | 1.948 | −0.680 | 0.087 | −0.154 | −0.269 | 0.273 |
| Experiment 5 | Mobile | 32.068 | 0.726 | −0.776 | 0.159 | N/A | 0.307 | 0.564 |
| Experiment 6 | Soccer | 28.279 | 1.118 | −0.788 | 0.134 | −0.041 | −0.062 | 0.407 |
| Experiment 7 | Stefan | 24.385 | 1.536 | −0.905 | 0.200 | 0.002 | 0.230 | −0.838 |

FIG.7

METHOD AND APPARATUS FOR VIDEO DECODING TO IMPROVE PICTURE QUALITY BASED ON PICTURE QUALITY ESTIMATION, IN THE PRESENCE OF NOISE

CLAIM OF PRIORITY

This application claims the benefit of the earlier filing date, pursuant to 35 USC 119, to that patent application filed in the Korean Patent Office on Dec. 20, 2007 and afforded serial number 10-2007-0134331, the contents of which are incorporated by reference herein.

BACKGROUND OF THE INVENTION

1. Field of the Invention

The present invention relates to a video decoding and more particularly, to a method for decoding data encoded by bit rate control.

2. Description of the Related Art

A conventional video encoder uses bit rate control to keep the bandwidth of a bit stream within a predetermined range. The bit rate control scheme keeps the bandwidth of the bit stream constant by controlling at least a quantization value that determines picture quality. However, the change of the quantization value leads to fluctuation of the picture quality, which is the main cause of picture flickering and low-quality video.

To reduce the bit rate control-incurred change of video quality in the video encoder, a video decoder should be aware of the level of picture quality. For this purpose, the Peak Signal to Noise Ratio (PSNR) of an original video is calculated during encoding and is provided to the video decoder on a separate channel. Thus, this conventional video encoding/decoding technology requires an additional device for performing a PSNR calculation and an additional channel to deliver information about the picture quality level to provide the picture quality level information to the video decoder.

SUMMARY OF THE INVENTION

An aspect of exemplary embodiments of the present invention is to provide a method for decoding encoded video data of a bit stream format to high-quality video data without separately generating picture quality information.

Moreover, an aspect of exemplary embodiments of the present invention provides a decoding method for estimating a picture quality level based on information acquired during decoding video data and filtering the decoded video data according to the estimated picture quality level.

In accordance with an aspect of exemplary embodiments of the present invention, there is provided a method for decoding video data that is encoded by bit rate control, in which the encoded video data is decoded, picture quality estimation information including information about a bit stream size of a decoded video frame, the number of fragmented macro blocks included in the video frame, and the number of skip-mode macro blocks included in the video frame is estimated, the picture quality of the video data is determined based on a correlation between picture quality estimation information and Signal-to-Noise Ratio (SNR), and the video data is output by applying a picture quality improving algorithm to the video data, if the determined picture quality is lower than a predetermined level.

The SNR can be PSNR. The SNR is estimated by the below equation and it is preferable to determine a picture quality of the video data based on the estimated SNR.

$$\text{Cost}(SIZE, SKIP, 4\,MV) = f(SIZE)\cdot\alpha + f(SKIP)\cdot\beta + f(4\,MV)\cdot\gamma$$

where $\alpha$, $\beta$ and $\gamma$ are weights and $f(x)$ is a standardization function defined as $$f(x) = \frac{X - \mu}{\mu}$$

where X is a target value and $\mu$ is an accumulated average.

To determine the picture quality, an SNR decrease can be calculated. The picture quality improving algorithm can be a PSNR improving algorithm.

In accordance with another aspect of exemplary embodiments of the present invention, there is provided an apparatus for decoding video data that is encoded by bit rate control, in which a decoder decodes the encoded video data, a picture quality detector estimates picture quality estimation information including information about a bit stream size of a decoded video frame, the number of fragmented macro blocks included in the video frame, and the number of skip-mode macro blocks included in the video frame, and measures the picture quality of the video data based on a correlation between picture quality estimation information and SNR, a picture quality improvement filter improves the picture quality of the video data received from the decoder, and a selection switch switches the video data selectively to one of a picture quality improvement filter and an external device according to the picture quality of the video data.

It is preferred that the picture quality detector measures the picture quality of the video data by calculating a decrease in an SNR estimated using the picture quality estimation information. The picture quality improvement filter can be a noise reduction filter.

BRIEF DESCRIPTION OF THE DRAWINGS

The above features and advantages of certain exemplary embodiments of the present invention will be more apparent from the following detailed description taken in conjunction with the accompanying drawings, in which:

FIG. 5. illustrates a condition of an exemplary embodiment of the present invention;

FIG. 6 illustrates a result estimated under the condition of FIG. 5; and

FIG. 7 illustrates a coefficient between the PSNR and the greatest power signal that is calculated by using the result of FIG. 6.

Throughout the drawings, the same drawing reference numerals will be understood to refer to the same elements, features and structures.

DETAILED DESCRIPTION OF THE INVENTION

The matters defined in the description such as a detailed construction and elements are provided to assist in a comprehensive understanding of exemplary embodiments of an invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
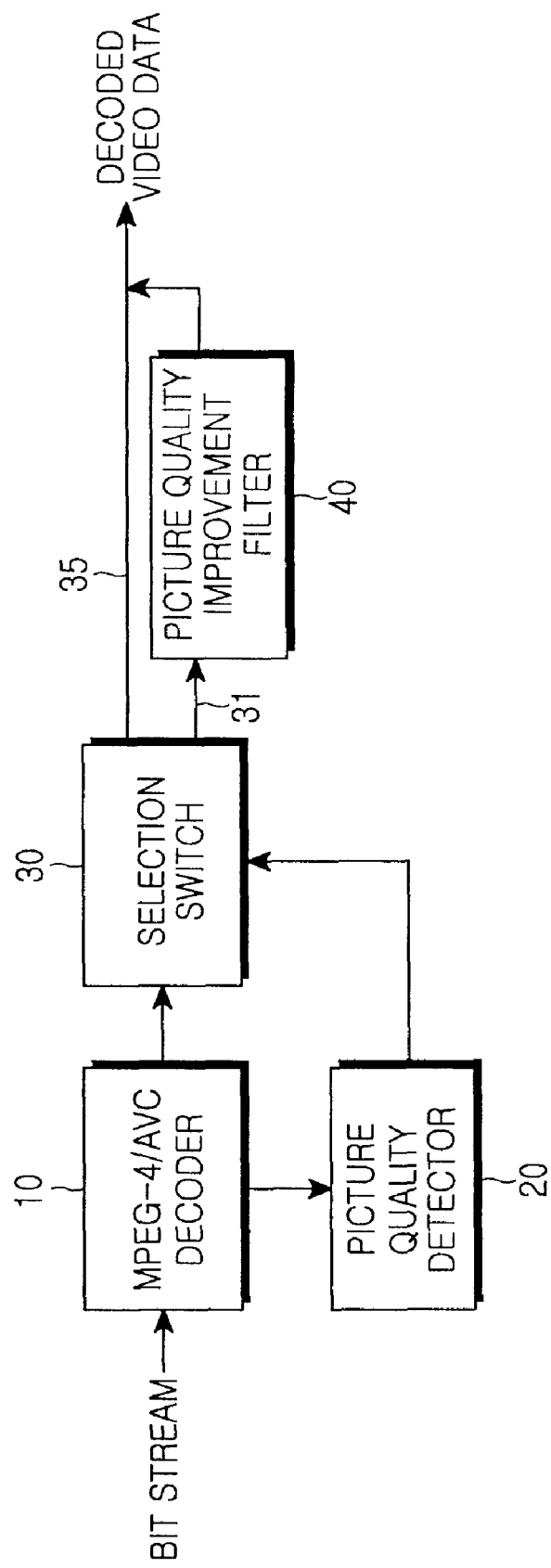
FIG. 1 is a block diagram of a video decoder according to an exemplary embodiment of the present invention.

FIG. 1 is a block diagram of a video decoder according to an exemplary embodiment of the present invention.

Referring to FIG. 1, the video decoder according to the exemplary embodiment of the present invention includes a Moving Picture Experts Group-4/Advanced Video Coding (MPEG-4/AVC) decoder 10, a picture quality detector 20, a selection switch 30, and a picture quality improvement filter 40.

The MPEG-AVC decoder 10 receives data encoded in a bit stream format by an MPEG-4/AVC encoder (not shown) and outputs color difference signal values for each pixel of the received video data. Also, the MPEG-4/AV decoder 10 provides information about the bit stream size, type and the fragmentation state of each macro block acquired during decoding the encoded data to the picture quality detector 20.

The picture quality detector 20 acquires picture quality estimation information based on the information received on a macro block basis from the MPEG-4/AVC decoder 10. The picture quality estimation information includes information about the bit stream byte size of a current received video frame, the number of skip-mode macro blocks included in the video frame, and the number of fragmented macro blocks. The picture quality detector 20 then estimates the Signal-to-Noise Ratio (SNR) of the received video based on the correlation between the SNR and the picture quality estimation information. Preferably, the SNR can be a PSNR.

Figure 2:
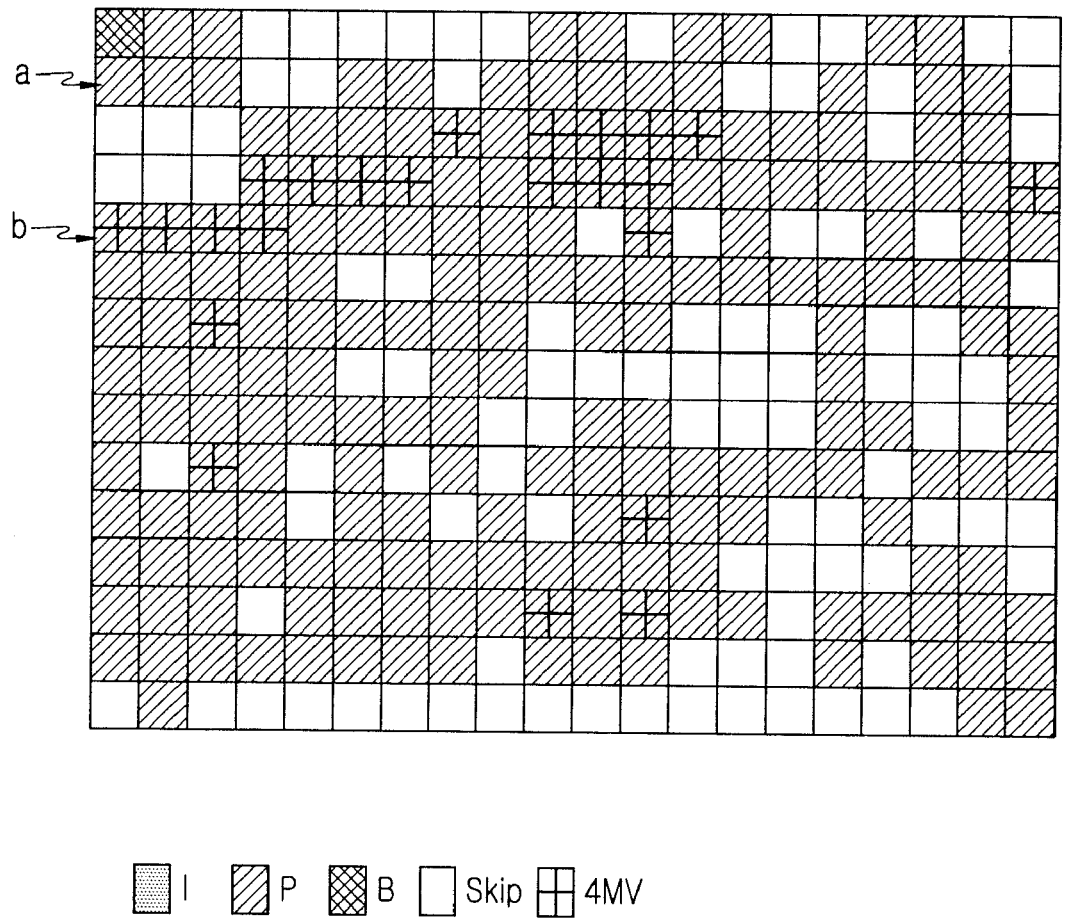
FIG. 2 illustrates an exemplary video frame decoded by the video decoder according to the exemplary embodiment of the present invention.

FIG. 2 illustrates an exemplary video frame decoded by the video decoder according to the exemplary embodiment of the present invention.

Referring to FIG. 2, reference character "a" denotes skip-mode macro blocks and reference character "b" denotes 4-fragment macro blocks. The picture quality detector 20 counts the number of the skip-mode macro blocks "a" in the video frame, SKIP and counts the number of the 4-fragment macro blocks "b", 4 MV. Preferably, the picture quality detector 20 calculates a reduction level in a SNR based on the video data that standardizes the correlation between the SNR and the picture quality estimation information. A cost of the SNR of the video image of a current frame is calculated by the below equation (1), using the calculated reduction level.

$$\text{Cost(SIZE, SKIP, 4 MV)} = f(\text{SIZE}) \cdot \alpha + f(\text{SKIP}) \cdot \beta + f(4\text{ MV}) \cdot \gamma \quad (1)$$

where $\alpha$, $\beta$ and $\gamma$ are weighting factors
$f(x)$ is a standardization function defined as $$f(x) = \frac{X - \mu}{\mu}$$

where X is a target value and $\mu$ is an accumulated average.

In one aspect, $\alpha$, $\beta$ and $\gamma$ can be set to −0.5, 0.1, and −0.4, respectively, and X represents the bit stream byte size of the video frame (SIZE), the number of the skip-mode macro blocks in the video frame (SKIP), or the number of the 4-fragment macro blocks (4 MV), and $\mu$ is the accumulated average of X. For instance, if 4 MV=10, 30 and 40 respectively in first, second and third video frames, X=40 for 4 MV and $\mu$ is the accumulated average of the first and second video frames, i.e. 20 in the third video frame.

While the picture quality detector 20 calculates a cost of an SNR of the video data by using the above equation (1) and determines a picture quality level of the video data based on the cost of the SNR in the exemplary embodiment of the present invention, to which the present invention is not limited, the picture quality level can be determined in other ways according to the correlation between SNR and picture quality estimation information extracted during decoding.

For example, the SNRs and picture quality estimation information of a plurality of videos are measured, the consistency and regularity of the SNRs and the picture quality estimation information are analyzed, and the correlation between SNR and picture quality information is placed accordingly.

The selection switch 30, which includes a single input port and a plurality of output ports, selectively switches the input port to one of the output ports. The output ports of the selection switch 30 are connected to an external output device (not shown) and the picture quality improvement filter 40, respectively. The selection is made among the output ports of the selection switch 30 based on the SNR estimated by the picture quality detector 20. In other words, the selection switch 30 compares the estimated SNR with the first predetermined threshold. If the estimated SNR is less than the first threshold, the selection switch 30 switches the input port to the output port connected to the picture quality improvement filter 40. If the estimated SNR is equal to or larger than the first threshold, the selection switch 30 switches the input port to the output port connected to the external output device. Given the first threshold of 40, if the average of SNRs received from the picture quality detector 20 is less than 40, the selection switch 30 connects the input port connected to the MPEG-4/AV decoder 10 to the output port connected to an input path 31 to the picture quality improvement filter 40. If the average SNR is equal to or larger than 40, the selection switch 30 connects the input port connected to the MPEG-4/AV decoder 10 to the output port connected to an input path 35 to the external output device.

The picture quality improvement filter 40 receives video data as the color difference signal values for each pixel from the MPEG-4/AVC decoder 10 and cancels noise from the video data.

For instance, the picture quality improvement filter 40 filters each pixel of the video frame and calculates the difference between the filtered value and the original signal value. If the difference is less than the second predetermined threshold, the picture quality improvement filter 40 cancels noise, determining that the pixel is noise. If the difference is larger than the second threshold, the picture quality improvement filter 40 recovers the original decoded value by adding the difference to the filtered value, considering that the pixel is not noise but an edge. Further, the picture quality improvement filter 40 compensates for a filtering-caused decrease in the value of the edge.

Figure 3:
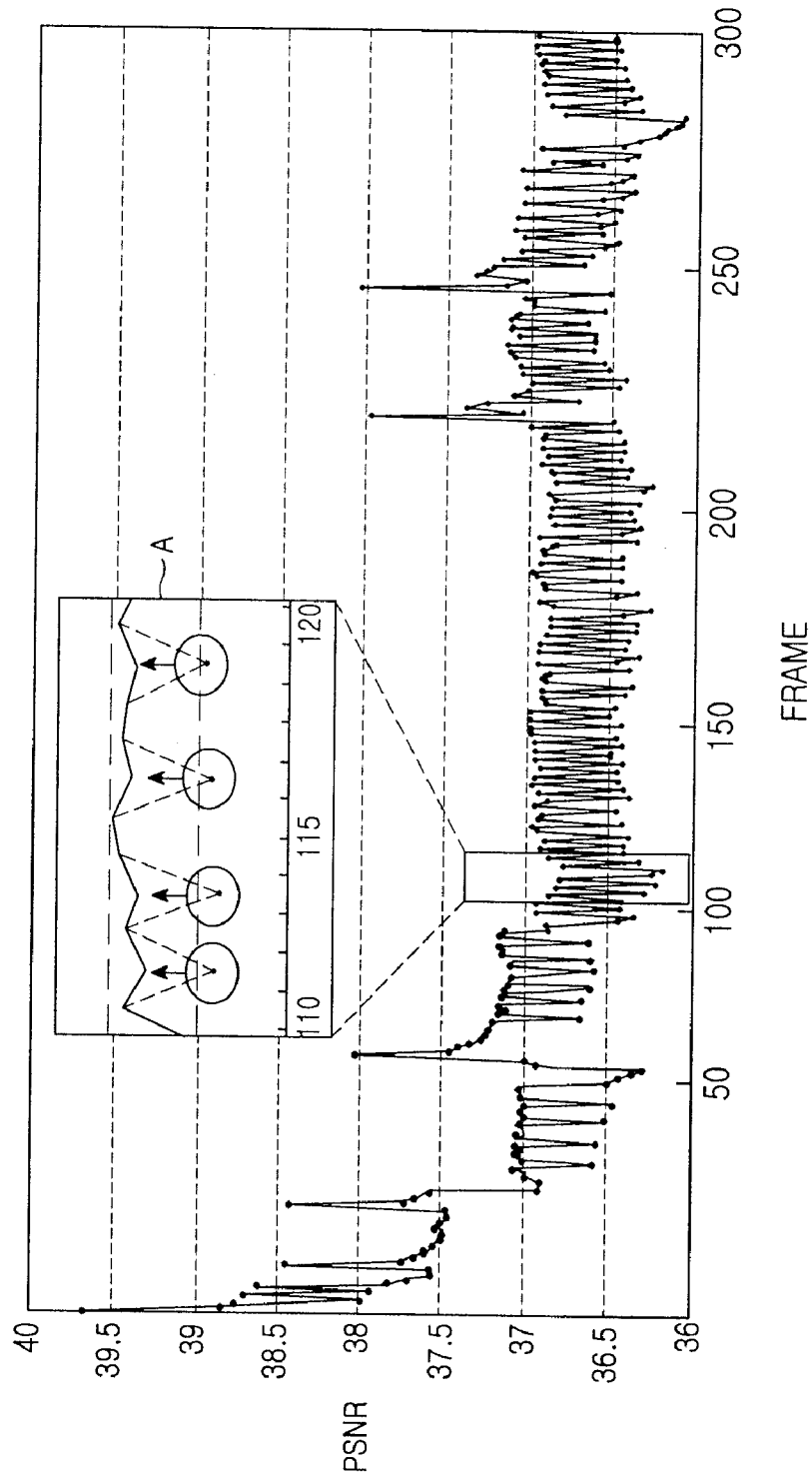
FIG. 3 is a graph illustrating PSNRs improvement by use of a picture quality improvement filter in the video decoder according to the exemplary embodiment of the present invention.

In accordance with the exemplary embodiment of the present invention, the picture quality improvement filter 40 filters each pixel in the video frame and detects and cancels noise in the video data using the difference between the filtered value and the original signal value, to which the present invention is not limited. Yet, the picture quality improvement filter 40 suffices as far as it improves the picture quality impaired during encoding. For example, the picture quality improvement filter 40 is enough if it can improve PSNR as illustrated in FIG. 3. In FIG. 3, a dotted line indicates a PSNR before improvement and a sold line indicates a PSNR improved by the picture quality improvement filter as shown in an enlargement area A.

Now a description will be made of an operation of the video decoder according to an exemplary embodiment of the present invention.

Upon receipt of data encoded in a bit stream format by a MPEG-4/AVC encoder, the MPEG-4/AVC decoder 10 recovers color difference signal values of pixels included in each video frame in an MPEG-4/AVC decoding scheme. During the decoding, the MPEG-4/AVC decoder 10 provides information about the bit stream size, type, and fragmentation state of each macro block, extracted from the received data, to the picture quality detector 20.

The picture quality detector 20 acquires picture quality estimation information based on the information received on a macro block basis and estimates the PSNR of the video frame by equation (1).

The selection switch 30 compares the estimated PSNR received from the picture quality detector 20 with the first predetermined threshold and selectively switches the input port connected to the MPEG-4/AVC decoder 10 to an output port connected to an external output device or a picture quality improvement filter 40. To be more specific, for the first threshold of 35.6, the selection switch 30 switches the input port to the output port connected to the picture quality improvement filter 40, if the estimated PSNR is less than the first threshold of 36.5 and switches the input port to the output port connected to the external output device, if the estimated PSNR is equal to or larger than the first threshold of 36.5.

When the MPEG-4/AVC decoder 10 is connected to the picture quality improvement filter 40, the picture quality improvement filter 40 receives video data from the MPEG-4/AVC decoder 10, filters each pixel of the video frame, and calculates the difference between the filtered value and the original signal value of the pixel. Then if the difference is less than the second predetermined threshold, the picture quality improvement filter 40 determines that the pixel is noise and cancels the noise. If the difference is larger than the second threshold, the picture quality improvement filter 40 determines that the pixel is an edge, not noise, and recovers the original decoded value by adding the difference to the filtered value. Further, Further, the picture quality improvement filter 40 compensates for a filtering-caused decrease in the value of the edge.

In accordance with the exemplary embodiment of the present invention, the picture quality improvement filter 40 determines the picture quality of the received video data by estimating the SNR of the video data, to which the present invention is not limited. The picture quality level can be one of stepwise values matching to predetermined SNR ranges. For example, picture quality levels 1, 2, 3, 4, 5 and 6 can be set respectively for an SNR range from 0 to below 10, an SNR range from 10 to below 20, an SNR range from 20 to below 30, an SNR range from 30 to below 40, an SNR range from 40 to below 50, and an SNR range from 50 to below 60. In addition, the first threshold of the selection switch 30 is an SNR value that can be one of the SNR ranges.

Figure 4:
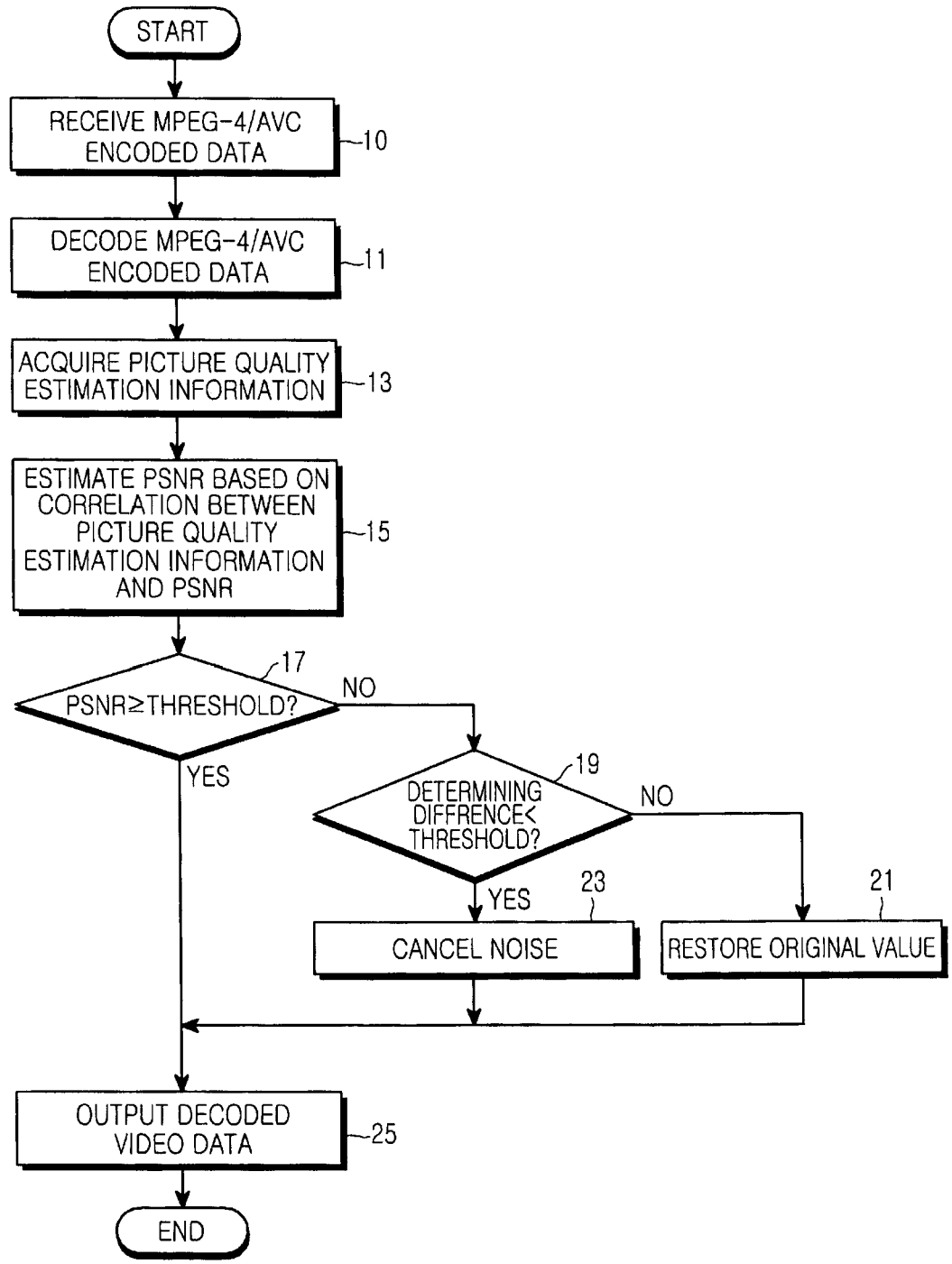
FIG. 4 is a flowchart illustrating a video decoding method according to an exemplary embodiment of the present invention.

FIG. 4 is a flowchart illustrating a video decoding method according to an exemplary embodiment of the present invention. It is assumed that video data encoded by an MPEG-4/AVC encoder is received through a communication device.

Referring to FIG. 4, upon receipt of the encoded data in step 10, the video decoder recovers color difference signal values of pixels included in each video frame in an MPEG-4/AVC decoding scheme in step 11.

In step 13, the video decoder extracts information about the bit stream size, type, and fragmentation state of each macro block from the video data during the decoding and acquires picture quality estimation information based on the information. The picture quality estimation information includes information about the size of the video frame, the number of skip-mode macro blocks included in the video frame, and the number of fragmented macro blocks included in the video frame.

The video decoder estimates the SNR of the video frame based on the correlation between picture quality estimation information and SNR in step 15. For example, the PSNR of the video frame is estimated by $$\text{Cost(SIZE,SKIP,4 MV)} = f(\text{SIZE}) \cdot \alpha + f(\text{SKIP}) \cdot \beta + f(4\ \text{MV}) \cdot \gamma \quad (2)$$

where $\alpha$, $\beta$ and $\gamma$ are weights;
$f(x)$ is a standardization function defined as $$f(x) = \frac{X - \mu}{\mu}$$

where X is a target value and $\mu$ is an accumulated average.

That is, X is the bit stream byte size of the video frame (SIZE), the number of the skip-mode macro blocks in the video frame (SKIP), or the number of the 4-fragment macro blocks (4 MV), and $\mu$ is the accumulated average of X. For instance, if 4 MV=10, 30 and 40 respectively in first, second and third video frames, X=40 for 4 MV and $\mu$ is the accumulated average of the first and second video frames, i.e. 20 in the third video frame.

In step 17, the video decoder compares the estimated PSNR with the first predetermined threshold (e.g. 36.5). If the estimated PSNR is less than the first threshold of 36.5, the video decoder performs step 19. If the estimated PSNR is equal to or larger than the first threshold of 36.5, the video decoder jumps to step 25.

In step 19, the picture quality improvement filter 40 of the video decoder filters each pixel of the video frame and compares the difference between the filtered value and the original value of the pixel with the second predetermined threshold, for noise cancellation. If the difference is less than the second threshold, the picture quality improvement filter 40 performs step 23. In the step 23, the picture quality improvement filter 40 determines that the pixel is noise and cancels the noise. If the difference is larger than the second threshold, the picture quality improvement filter 40 performs step 21. In the step 21, the picture quality improvement filter 40 determines that the pixel is an edge, not noise, and outputs the original decoded value by adding the difference to the filtered value.

In step 25, the video decoder outputs the video data decoded in step 11 or the video data compensated in step 23 to an external output device such as a display.

While in accordance with the exemplary embodiment of the present invention, the picture quality of the received video data is determined by estimating the PSNR or other measure of quality, of the video data. The picture quality level can be determined as one of stepwise values matching to predetermined SNR ranges. For example, picture quality levels 1, 2, 3, 4, 5 and 6 can be set respectively for an SNR range from 0 to below 10, an SNR range from 10 to below 20, an SNR range from 20 to below 30, an SNR range from 30 to below 40, an SNR range from 40 to below 50, and an SNR range from 50 to below 60. In addition, the threshold of step 17 is an SNR value, which can be one of the SNR ranges.

While video data is encoded and decoded based on an MPEG-4/AVC standard in the exemplary embodiments of the present invention, to which the present invention is not limited, it is to be clearly understood that the present invention is also applicable to various video encoding/decoding schemes such as H.263 and H.264.

Also, while the picture quality level of video data is determined by equation (2) in step 15, to which the present invention is not limited, the determination can be made in many ways based on the correlation between SNR and picture quality information extracted during decoding the video data. For example, the SNRs and picture quality estimation information of a plurality of videos are measured, the consistency and regularity of the SNRs and the picture quality estimation information are analyzed, and the correlation between SNR and picture quality information is placed accordingly. How the correlation between SNR and picture quality estimation information is set will be described, using experiment examples.

The video encoding and decoding experiments of the present invention are carried out for typical seven videos (Container, Crew, Foremen, Harbor, Mobile, Soccer, and Stefan) under the conditions of image sizes, frame rates, total frame numbers, data rates, and I-frame intervals set as illustrated in FIG. 5.

Referring to FIG. 5, an image size of QVGA (320×240 p) is set for Experiment 1, Experiment 2 and Experiment 3 and an image size of CIF (352×288 p) is set for Experiment 4 to Experiment 7. The frame rates, total frame numbers, data rates, and I-frame intervals of Experiment 1 to Experiment 7 are the same, 30 fps, 300 frames, 384 kbps, and 30 frames.

The videos are encoded in MPEG-4. Then the PSNRs of each video are measured and the average AVG and standard deviation STDDEV of the PSNRs are listed in FIG. 6. Also, for 300 video frames in each video type, the byte sizes of bit streams SIZE, the numbers of skip-mode macro blocks SKIP, the numbers of intra-mode macro blocks INTRA, average motion vector powers MV_PWR, and the numbers of 4-fragment macro blocks 4 MV are measured and their averages are listed in FIG. 6.

Correlation coefficients between PSNR and SIZE, SKIP, INTRA, MV_PWR, and 4 MV illustrated in FIG. 6 are computed by equation (3) and listed in FIG. 7.

$$\text{Correlation}(X, Y) = \frac{\sum (x - \bar{x})(y - \bar{y})}{\sqrt{\sum (x - \bar{x})^2 (y - \bar{y})^2}}$$

$X = AVG(\text{array1}):PSNR$ $y = AVG(\text{array2}):SIZE, SKIP, INTRA, MV\_PWR, 4MV$ As noted from Figure xxz PSNR increases with SIZE and with 4 MV whereas PSNR decreases with SKIP. Based on these experiment results, the correlation between PSNR and picture quality estimation information can be set as equation (4), which can be standardized in different ways;

$$\frac{1}{PSNR} \propto \left(\frac{1}{SIZE}\right) \cdot (SKIP) \cdot \left(\frac{1}{4MV}\right) \tag{4}$$

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As is apparent from the above description, the present invention advantageously estimate the picture quality of video data based on information acquired during decoding encoded video data without additional information representing the picture quality level (e.g. a PSNR). Further, compensation of the video data according to the estimated picture quality results in a high-quality video.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for decoding video data that is encoded by bit rate control, comprising: decoding the encoded video data; estimating picture quality estimation information including information about a bit stream byte size of a decoded video frame (SIZE), the number of 4-fragment macro blocks included in the video frame (4 MV), and the number of skip-mode macro blocks included in the video frame (SKIP); determining a picture quality of the video data based on a correlation between the picture quality estimation information and Signal-to-Noise Ratio (SNR), wherein the SNR is estimated by using the bit stream byte size of the video frame, the number of the skip-mode macro blocks in the video frame, and the number of the 4-fragment macro blocks, and the picture quality of the video data is determined based on the estimated SNR; and outputting the video data by applying a picture quality improving algorithm to the video data, if the determined picture quality is lower than a predetermined level.

2. The method of claim 1, wherein the SNR is Peak Signal-to-Noise Ratio (PSNR).

3. The method of claim 1, wherein the picture quality determination comprises calculating an SNR decrease.

4. The method of claim 1, wherein the picture quality improving algorithm is a PSNR improving algorithm.

5. The method of claim 1, wherein said picture quality improvement algorithm: determines a difference between a filtered value and an original signal value; determines whether said difference is less than a predetermined threshold; and cancels said original signal value as noise if said difference is less than said predetermined threshold.

6. A device for decoding video data that is encoded by bit rate control, comprising: a processor in communication with a memory, the memory including code which when accessed by the process causes the process to: decode the encoded video data; evaluate picture quality estimation information including information about a bit stream byte size of a decoded video frame (SIZE), the number of 4-fragment macro blocks included in the video frame (4 MV), and the number of skip-mode macro blocks included in the video frame (SKIP); determine a picture quality of the video data based on a correlation between the picture quality estimation information and a Signal-to-Noise Ratio (SNR), wherein the correlation between the picture quality estimation information and SNR is given by using a bit stream byte size of the video frame, the number of the skip-mode macro blocks in the video frame, and the number of the 4-fragment macro blocks;

and output the video data by applying a picture quality improving algorithm to the video data, if the determined picture quality is lower than a predetermined level.

7. The apparatus of claim 6, wherein the SNR is Peak Signal-to-Noise Ratio (PSNR).

8. The apparatus of claim 6, wherein the picture quality determination comprises calculating an SNR decrease.

9. The apparatus of claim 6, wherein the picture quality improving algorithm is a PSNR improving algorithm.

10. An apparatus for providing a decoded video output comprising: a processor in communication with a memory, said processor accessing code in said memory which provides instruction to said processor to execute the steps of: receiving and decoding an encoded video signal; determining a picture quality of said decoded video signal based on at least one of a bit stream byte size of a decoded video frame (SIZE), the number of 4-fragment macro blocks included in the video frame (4 MV), and the number of skip-mode macro blocks included in the video frame (SKIP); correlating said picture quality with a Signal-to-Noise Ratio (SNR), wherein the SNR is estimated by using the bit stream byte size of the video frame, the number of the skip-mode macro blocks in the video frame, and the number of the 4-fragment macro blocks, and said picture quality of the video signal is determined based on the estimated SNR; and outputting the decoded video signal to a picture quality improving algorithm if the determined picture quality is greater than a predetermined level.

11. The apparatus of claim 10, wherein said improvement algorithm further recovers an original decoded signal value by adding a difference to a filtered value.

12. The apparatus of claim 10, wherein said picture quality improvement algorithm: determines a difference between a filtered value and an original signal value; determines whether said difference is less than a predetermined threshold; and cancels said original signal value as noise if said difference is less than said predetermined threshold.

\* \* \* \* \*